United States Patent
Li et al.

(10) Patent No.: US 11,095,580 B2
(45) Date of Patent: *Aug. 17, 2021

(54) INSTANT MESSAGE (IM) ROUTING TO A VIRTUAL USER CONSISTING OF A GROUP OF POSSIBLE SUB-USERS ASSOCIATED WITH A COMMON IM IDENTITY

(71) Applicant: International Business Machines Corporation, Armonk, NY (US)

(72) Inventors: Zhang Li, Beijing (CN); Su Ying Rui, Beijing (CN); Shou Hui Wang, Beijing (CN); Zhi Yu Yue, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/218,836

(22) Filed: Jul. 25, 2016

(65) Prior Publication Data
US 2016/0337274 A1 Nov. 17, 2016

Related U.S. Application Data

(63) Continuation of application No. 12/057,558, filed on Mar. 28, 2008, now Pat. No. 9,401,819.

(30) Foreign Application Priority Data

May 28, 2007 (CN) .......................... 200710105573.0

(51) Int. Cl.
*H04L 12/58* (2006.01)
*H04L 29/06* (2006.01)

(52) U.S. Cl.
CPC .............. *H04L 51/04* (2013.01); *H04L 67/42* (2013.01); *H04L 51/14* (2013.01)

(58) Field of Classification Search
CPC ............................. H04L 12/581; H04L 51/04
See application file for complete search history.

(56) References Cited

U.S. PATENT DOCUMENTS 6,070,149 A * 5/2000 Tavor ..................... G06Q 30/02
705/26.7
7,206,757 B2 4/2007 Seigel et al.
(Continued)

FOREIGN PATENT DOCUMENTS

CN 101316377 A 12/2008

OTHER PUBLICATIONS

Klensin, "Simple Mail Transfer Protocol", Apr. 2001, https://tools.ietf.org/html/rfc2821, whole document.*
(Continued)

*Primary Examiner* — Douglas B Blair
(74) *Attorney, Agent, or Firm* — Cuenot, Forsythe & Kim, LLC

(57) ABSTRACT

Disclosed are a method, apparatus and system for instant message routing. The method includes: receiving a communication request from a source client to a destination client; acquiring the context associated with the source client and the destination client; and selecting a sub-user of the destination client for communication using a policy according to the context. When a source client requests communication with a virtual user, the method can route the communication request using a policy according to the context, to a sub-user of the virtual user which once communicated with the source client.

18 Claims, 3 Drawing Sheets

(56) References Cited

U.S. PATENT DOCUMENTS

| | | | |
|---|---|---|---|
| 7,275,215 B2 | 9/2007 | Werndorfer et al. | |
| 7,299,259 B2 | 11/2007 | Petrovykh | |
| 7,356,345 B2 | 4/2008 | Cunningham et al. | |
| 7,765,265 B1* | 7/2010 | Granito | G06Q 10/107 707/999.003 |
| 7,788,329 B2 | 8/2010 | Barrett et al. | |
| 7,975,009 B2 | 7/2011 | Wilensky | |
| 8,885,812 B2* | 11/2014 | Margulies | G06Q 30/02 379/265.02 |
| 9,253,132 B2* | 2/2016 | Boss | H04L 51/14 |
| 9,398,152 B2* | 7/2016 | Christensen | H04M 3/5191 |
| 9,401,819 B2* | 7/2016 | Li | H04L 51/04 |
| 9,576,292 B2* | 2/2017 | Freishtat | G06Q 30/01 |
| 2002/0055975 A1 | 5/2002 | Petrovykh | |
| 2004/0153368 A1* | 8/2004 | Freishtat | G06Q 30/01 705/26.41 |
| 2004/0189698 A1* | 9/2004 | Bokish | H04M 3/523 715/751 |
| 2005/0111653 A1* | 5/2005 | Joyce | H04M 3/523 379/265.09 |
| 2005/0165680 A1* | 7/2005 | Keeling | G06Q 20/14 705/40 |
| 2006/0009249 A1* | 1/2006 | Fu | H04W 4/10 455/518 |
| 2006/0014552 A1 | 1/2006 | Cunningham et al. | |
| 2006/0101098 A1 | 5/2006 | Morgan et al. | |
| 2006/0167941 A1* | 7/2006 | Huang | G06Q 30/02 |
| 2006/0242235 A1 | 10/2006 | Classen et al. | |
| 2007/0150491 A1* | 6/2007 | Torvinen | H04L 67/30 |
| 2007/0253424 A1* | 11/2007 | Herot | H04L 12/1818 370/395.2 |
| 2008/0077309 A1* | 3/2008 | Cobbold | G06Q 10/10 701/117 |
| 2008/0183822 A1* | 7/2008 | Cai | H04L 51/12 709/206 |
| 2008/0214159 A1 | 9/2008 | Cunningham et al. | |
| 2008/0228890 A1 | 9/2008 | George et al. | |
| 2008/0301230 A1 | 12/2008 | Li et al. | |
| 2010/0100490 A1 | 4/2010 | Lewis-Hawkins | |
| 2012/0185548 A1 | 7/2012 | Will | |

OTHER PUBLICATIONS

U.S. Appl. No. 12/057,558, Non-Final Office Action, dated Apr. 15, 2010, 11 pg.

U.S. Appl. No. 12/057,558, Final Office Action, dated Oct. 22, 2010, 15 pg.

U.S. Appl. No. 12/057,558, Non-Final Office Action, dated Nov. 6, 2012, 20 pg.

U.S. Appl. No. 12/057,558, Final Office Action, dated Jul. 22, 2013, 18 pg.

U.S. Appl. No. 12/057,558, Non-Final Office Action, dated Sep. 21, 2015, 8 pg.

U.S. Appl. No. 12/057,558, Notice of Allowance, dated Apr. 25, 2016, 6 pg.

* cited by examiner

INSTANT MESSAGE (IM) ROUTING TO A VIRTUAL USER CONSISTING OF A GROUP OF POSSIBLE SUB-USERS ASSOCIATED WITH A COMMON IM IDENTITY

CROSS-REFERENCE TO RELATED APPLICATIONS

This application claims the benefit of Chinese Patent Application No. 200710105573.0 filed 28 May 2007, which is hereby incorporated by reference.

BACKGROUND OF THE INVENTION

The present invention relates to the field of instant messaging, and more particularly, to a method, apparatus and system for instant message routing.

Instant messaging (IM) is a form of real-time communication between two or more people in which text, speech, and/or video is exchanged. As used herein, IM communications can include communications conducted using a chat based protocol, a text messaging based protocol, and/or a protocol specific to IM communications. Comparing with e-mails or phone, instant messaging has its unique advantages. For example, there is less interference in communication via instant messaging than communication in phone; most instant messaging systems allow users to set their presence status information on the client side to show whether or not they are available; and, it is unnecessary to reply immediately via instant messaging. Therefore, instant messaging becomes more and more popular in web applications and enterprise environment.

A current instant messaging system is composed of server(s) and clients. The functions of instant messaging server(s) in an instant messaging system are typically to collect client's status information, to initialize sessions with clients and to transmit an instant messaging session in common cases. On the client side, each end user can log on an instant messaging system with its own ID. When a user wants to communicate with another user, the source client in the instant messaging system sends a request for communication to the server. The server then transmits the request to the corresponding destination client and transmits response information from the destination client to the source client; thereby the communication between the source client and the destination client is set up.

Users in a traditional instant messaging system have the same capability, whereas users in some current instant messaging systems have unequally capability. For example, in an online shopping center using instant messaging, buyers and sellers are each able to use clients in the instant messaging system, with the former being source clients and the latter being destination clients. A seller may have a plurality of salesmen, namely sub-users, each of which has an IM account number, for example. Where a plurality of salesman of the seller is online at the same time, after a buyer communicates with one or more salesmen of the seller, for example, buys a product, the buyer wants to communicate with the same salesman (salesmen) once more according to a certain policy which might be, for example, selecting the latest salesman whom the buyer communicated with, selecting the currently freest salesman among the salesmen whom the buyer communicated with, selecting the salesman who is the nearest to the buyer's geographical location among the salesmen whom the buyer communicated with, or the like. However, the prior art cannot solve the problem of selecting sub-users out of destination clients according to a policy.

BRIEF SUMMARY OF THE INVENTION

In view of the problem described above, the present invention provides a method, apparatus and system for instant message routing.

The present invention is able to route the communication request using a policy according to the context, to a sub-user of the destination client which once communicated with the source client, whenever a source client requests communication with a destination client.

According to a first aspect of the present invention, there is provided a method for instant message routing that includes: receiving a communication request from a source client to a destination client; acquiring the context associated with the source client and the destination client; and selecting a sub-user of the destination client for communication using a policy according to the context.

According to a second aspect of the present invention, there is provided an apparatus for instant message routing that includes: a receiver operable to receive a communication request from a source client to a destination client; an acquirer operable to acquire the context associated with the source client and the destination client; and a selector operable to select a sub-user of the destination client for communication using a policy according to the context.

According to a third aspect of the present invention, there is provided a system for instant message routing that includes: a source client operable to communicate with a destination client; a destination client comprising one or more sub-users and operable to have one sub-user thereof communicate with the source client; and a server operable to select a sub-user of the destination client for communication with the source client using a policy according to the context associated with the source client and the destination client.

Other features and advantages of the present invention will become apparent from the following detailed description of preferred embodiments illustrating the principles of the invention, when taken in conjunction with the accompanying drawings.

BRIEF DESCRIPTION ON THE SEVERAL VIEWS OF THE DRAWINGS

DETAILED DESCRIPTION OF THE INVENTION

Figure 1:
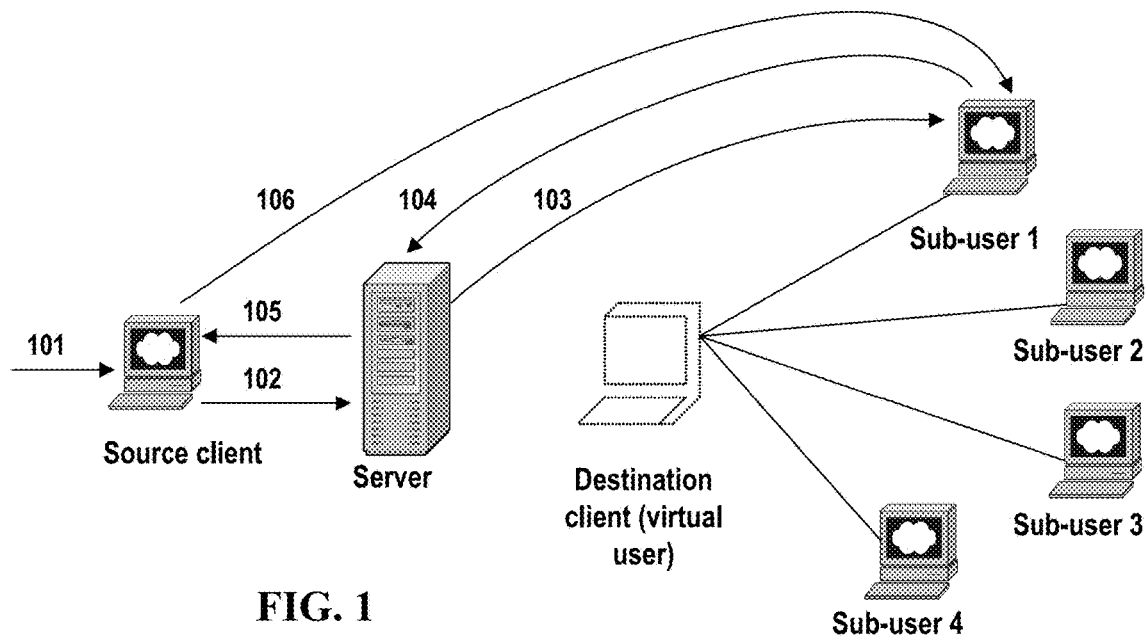
FIG. 1 is a schematic view of an instant messaging system according to an embodiment of the present invention.

The embodiments of the present invention will be described in detail.

It is to be understood that among the terms adopted in the present invention, common users and virtual users are different types of clients in an instant messaging system.

"Common users" are traditional users in an instant messaging system.

"Virtual users" are users in an instant messaging system, which has an associated profile of a common user, and which can contain one or more common users as a group of sub-users. When a common user communicates with a virtual user, the common user regards the virtual user as its communication partner, whereas it actually communicates with one of sub-users belonging to the virtual user, and typically it does not know which sub-user it is exactly communicating with.

"Sub-user" can be a common user in an instant messaging system, which may employ a common user ID (identifier) independent of the virtual user ID of the virtual user it belongs to or take a virtual user ID as its user ID without an independent user ID.

In the present invention, the functions of "server(s)" in an instant messaging system are to maintain communication between clients (for example, common users and virtual users including one or more sub-users) in the instant messaging system and store the related communication information, such as context.

"Context" can include a source client ID, a destination client ID, a destination client's sub-user ID, personal information, geographical information, communication status information and communication history of a source client, geographical information, communication status information and communication history of a destination client, as well as geographical information and communication status information of a sub-user of a destination client. Communication status information includes a time stamp, bandwidth of communication, operating system information, and so on.

"Policy" is a setting for selecting a proper sub-user for communication according to the information contained in context. For example, policies may include: selecting an available sub-user with which the communication is the latest according to communication historical records in the context; selecting an available sub-user in the nearest geographical location according to the geographical location information in the context; selecting an available sub-user with the smallest load according to the load information in the context; selecting a sub-user by combining some policies according to different information in the context, and so on.

An example of an application scenario of the present invention will first be explained before the embodiments of the present application will be described in detail.

First, a common user A and a virtual user B log on to an instant messaging system. The common user A logs on in a conventional way, the details of which are omitted here. During log on, the virtual user B sends a logon request to a server. Upon receipt of the request, the server checks the user type of the virtual user B and learns that the user is a virtual user including N sub-users. Then, the server searches a table on which user information is recorded, gets information on the sub-users of the virtual user B, and acquires presence information and status information of each sub-user of the virtual user B to update the current presence information and status information of the virtual user B.

Next, the common user A communicates with the virtual user B via the server. Since the virtual user B is a group consisting of N sub-users, when the common user A requests communication with the virtual user B, it is actually communicating with one of sub-users of the virtual user B. Therefore, how to select a proper sub-user for communication with the common user A is a problem to be solved by the present invention.

FIG. 1 is a schematic view of an instant messaging system according to an embodiment of the present invention. A server helps a source client requesting connection setup to find a destination client the source client wants to communication with. Then, the communication is set up between these two clients. Thereafter, the two clients communicate directly without the server's participation, or they communicate taking the server as a bridge (not shown in FIG. 1). In the example shown in FIG. 1, the destination client is a virtual user consisting of four sub-users, namely sub-user 1, sub-user 2, sub-user 3, and sub-user 4. Assuming that the source client has recently communicated with sub-user 1 of the destination client, when the source client wants to communicate with the destination client once more, the server will use a policy to select a sub-user of the destination client for communication with the source client according to the context-based routing method of the present invention, so that the source client can communicate with sub-user 1 other than sub-user 2, sub-user 3 or sub-user 4 of the destination client once more. Steps 101-106 of FIG. 1 will be further explained in FIG. 2.

Figure 2:
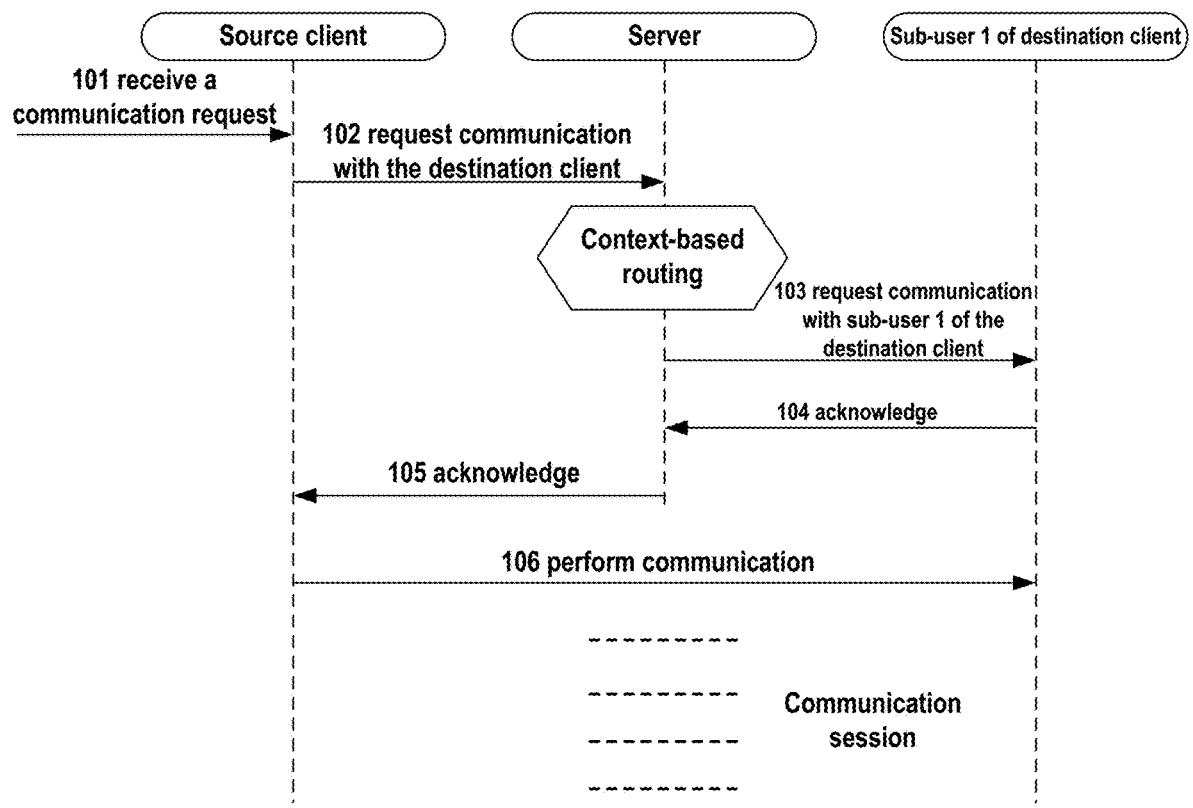
FIG. 2 is a timing view of operations for setting up communication in the instant messaging system shown in FIG. 1.

FIG. 2 is a timing view of operations for setting up communication in the instant messaging system shown in FIG. 1. It should be noted that the context-based routing method of the present invention is implemented at the server side of the instant messaging system, as shown by the hexagon in FIG. 2.

In step 101, the source client receives a communication request from the outside and gets the ID of the destination client according to the requested content. In step 102, the source client sends a request to the server for communication with the destination client. Upon receipt of the request, the server acquires the context associated with the source client and the destination client, and uses the policy to select a sub-user of the destination client for communication according to the context. The selected sub-user is sub-user 1 of the destination client which has communicated with the source client recently. In step 103, the server transfers the communication request from the source client to sub-user 1 of the destination client, requesting communication therewith. In step 104, sub-user 1 of the destination client agrees to communicate with the source client, making an acknowledgement to the server. In step 105, the server transfers the response message indicating an acknowledgement of communication to the client. In step 106, the source client communicates with sub-user 1 with which a connection has been set up.

Figure 3:
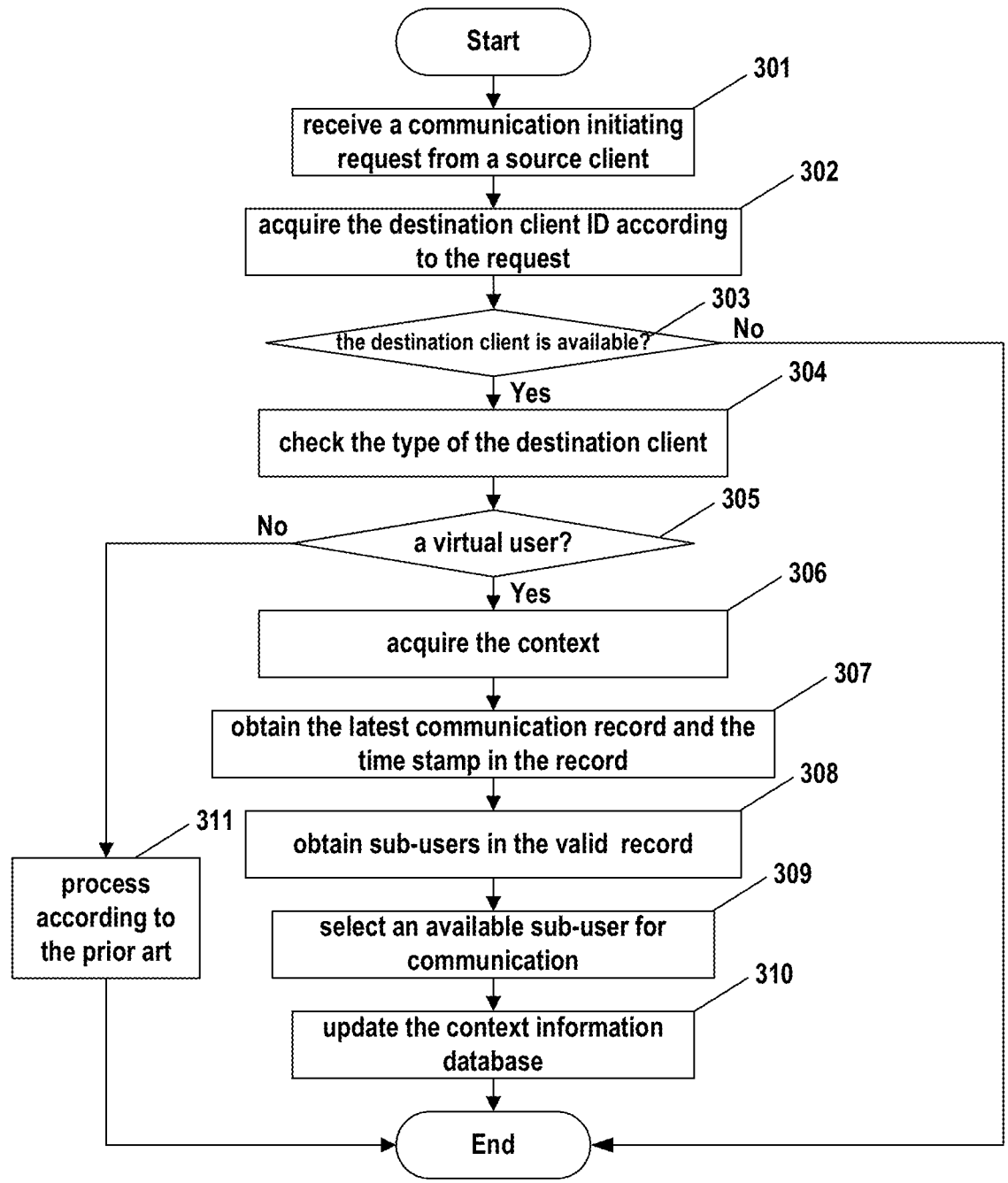
FIG. 3 is a flowchart of a method for instant message routing according to an embodiment of the present invention.

FIG. 3 is a flowchart of a method for instant message routing according to an embodiment of the present invention. The method corresponds to the processing performed by the server for selecting a sub-user of the destination client based on context between step 102 and step 103 in FIG. 2. The method of the present invention will be described in detail in terms of the flowchart of FIG. 3.

In step 301, a communication initiating request is received from a client. As described previously, in an instant messaging system, a user on the source client side initiates a communication request, and then the server receives the request and performs corresponding processing according to the content contained in the request. The communication request may include a variety of information, such as a source client ID, a destination client ID which the source client wants to communication with, and so on.

In step 302, the destination client ID is obtained according to the received communication request. Upon receipt of the communication request from the source client, the server gets the destination client ID contained in the request, with that the source client wants to communicate.

In step 303, it is determined whether or not the destination client is available. Before communication is set up between the source client and the destination client, it is necessary to determine in advance whether or not the destination client is available.

Usually a traditional instant messaging system is provided with the function to support various statuses of a common user, like "online," "busy," "away," "offline" etc. During the traditional processing for determining a client status, it is necessary to query a client status table stored on the server or other server-accessible storage medium, each record of the client status table including the ID of a client, the status of the client, and so on. For example, when the status of a destination client in one record is "online," "busy," and "away," the destination client is regarded as available, and when its status is "offline," the destination client is regarded as unavailable.

In contrast to a traditional instant messaging system, the present invention introduces a new kind of users, namely virtual user. A virtual user may comprise a plurality of common users as sub-users. Therefore, different from a common user, the status of a virtual user can have various definition methods. For example, the status of a virtual user can be defined as follows:

Virtual User "online," i.e. one or more sub-users are "online";

Virtual User "busy," i.e. all the sub-users are "busy", or some are "busy" while others are "offline" or "away";

Virtual User "away," i.e. all the sub-users are "away", or some are "away" and others are "offline";

Virtual User "offline," i.e. all the sub-users are "offline."

In the present invention, status information of both virtual users and common users is stored in the client status table. During the processing for determining a client status of the present invention, it is also necessary to query the client status table, each record of the client status table including the ID of a client (including a common user and a virtual user), the status of the client, and so on. In this embodiment, the client status table is stored on the server. Additionally, the client status table may be stored on other server-accessible storage medium. According to the status information of a client, various ways can be employed to determine whether or not the client is available. For example, when a destination client's status in records is "online," "busy" and "away," the destination client is regarded as available, and when its status is "offline," the destination client is regarded as unavailable. For another example, when a destination client's status in records is "online," the destination client is regarded as available, and when its status is "busy," "away" and "offline," the destination client is regarded as unavailable.

If the destination client is determined as available, the processing goes to step 304, otherwise the processing ends. In this embodiment, the status of sub-user 1 of the destination client is "online," and the status of sub-user 2 is "offline," and the status of sub-user 3 is "busy," and the status of sub-user 4 is "online," so the status of the destination client is "online." And the processing goes to step 304.

In step 304, the type of the destination client is checked. In the present invention, the destination client might be a common user or a virtual user consisting of one or more sub-users. Different processing means are employed for different types of clients. Therefore, it is necessary to query a client type table stored on the server or other server-accessible storage medium. In the client type table there are recorded the ID of a client, the type of the client, and so on. The client type table and the client status table may be one same table or different tables stored separately. According to the client type table, the destination client can be searched and its type can be determined.

In step 305, it is determined whether or not the destination client is a virtual user. When the client is a virtual user, the flow goes to a subsequent step, i.e. step 306. When the client is not a virtual user, the flow goes to step 311. At this point, the processing is performed using the prior art. The communication setup request is transferred to the destination client which is a common user, and then the processing ends. In this embodiment, the destination client is a virtual user which has sub-user 1 to 4. Therefore, the flow goes to step 306.

In step 306, context associated with the source client and the destination client is acquired. The context of the source client, the destination client with which communication was once set up and the sub-users thereof is stored in a context information database. The context information database may be located on the server or other server-accessible storage medium. In this embodiment, the context information database is located on the server. Context may comprise, for example, communication historical records including time stamps, source client IDs, destination client IDs and sub-user IDs, or other information associated with communication between a source client and a destination client. In step 306, for example, the context containing a source client ID can be obtained by taking the source client ID as a query keyword, and among the query results, the context containing a destination client ID can be obtained by taking the destination client ID as a query keyword.

In step 307, the latest communication historical records and the time stamps among the records are obtained according to the context. Table 1 shows the communication historical records contained in the context obtained in this embodiment.

TABLE 1

| time | source client ID | destination client ID | sub-user ID | ... |
|---|---|---|---|---|
| 11:45:10, Jan. 16, 2007 | abc | XianFengShuDian | ShopAssistant1 | ... |
| 14:23:49, Jan. 15, 2007 | abc | XianFengShuDian | ShopAssistant3 | ... |
| ... | ... | ... | ... | ... |

Table 1 shows two records. One is that a source client with the ID of abc communicated with sub-user 1, namely ShopAssistant1, of a destination client with the ID of XianFengShuDian, at 11:45:10 on Jan. 16, 2007. And the other is that a source client with the ID of abc communicated with sub-user 3, namely ShopAssistant3, of a destination client with the ID of XianFengShuDian, at 14:23:49 on Jan. 13, 2007.

In this embodiment, according to the context shown in Table 1, the communication performed at 11:45:10 on Jan. 16, 2007 of the first record is the latest communication historical record. In this communication record, the source client abc performed communication with sub-user 1, namely ShopAssistant1, of the destination client XianFengShuDian, and the time stamp is 11:45:10, Jan. 16, 2007.

In step 308, after the time stamp of the latest communication record is obtained, it is necessary to determine whether or not the record is valid. If the record is valid, the sub-user ID of the valid record is acquired. That is, the sub-user of the valid record is obtained. In this embodiment, assume this step was performed at 13:05:55 on Jan. 16, 2007. Additionally, assume in the instant messaging system of the present invention, the expiration time for judging whether a record is valid is one day, i.e. 24 hours. Since the first record was no more than one day, it is valid. Hence, the ID ShopAssistant1, sub-user 1 of the destination client XianFengShuDian, which is associated with the source client abc is obtained, and then the flow goes to step 309.

It is to be understood that in any instant messaging system, different expiration times for judging whether or not a record is valid can be defined, such as one hour, two hours, one week, one month etc.

If the expiration time for judging whether or not a record is valid is one hour, the first record is invalid since it was one hour 20 minutes and 45 seconds ago. Hence, other policy can be selected to select a sub-user.

In another embodiment of the present invention, if the latest communication historical record is determined as invalid, then according to sub-users' load information in the context, an available sub-user with the smallest load can be selected as the sub-user with which the source client communicates.

In a further embodiment of the present invention, if the latest communication historical record is determined as invalid, then according to sub-users' geographical location information in the context, an available sub-user in the nearest geographical location can be selected as the sub-user with which the source client communicates.

In step 309, if obtained sub-user 1, namely ShopAssistant1 is determined as available, the sub-user is selected to communicate with the source client. In this embodiment, sub-user 1 to 4 are all common users, so the method for judging the status of a sub-user is the same as that for determining the status of a common user in the prior art. The status of sub-users is stored in a sub-user status table on the server or other server-accessible storage medium, and each record of the sub-user status table may include the ID of a sub-user, the client ID which the sub-user belongs to, the status of the sub-user, and so on. According to the status of the sub-user, including "online," "busy," "away" and "offline" for example, various means can be employed to define whether or not the sub-user is available. For example, when the status of a sub-user in the sub-user status table is "online," "busy" or "away," the destination client is regarded as available, so the sub-user is selected to communicate with the source client. When its status is "offline," the destination client is regarded as unavailable, so other policy can be used to select a sub-user, such as based on the smallest load or the nearest geographical location according to the context.

In this embodiment, the status of sub-user 1, namely ShopAssistant1 is "online." Therefore, the sub-user is determined as available, and sub-user 1, namely ShopAssistant1 is selected as the sub-user of the destination client (XianFengShuDian) to communicate with the source client abc.

In step 310, context associated with the source client and the destination client and contained in the context information database is updated. For example, a record that the source client abc communicated with sub-user 1, namely ShopAssistant1 of the destination client XianFengShuDian at 13:05:55 on Jan. 16, 2007, is added to the context information database, just as shown by the first record in Table 2. Then, the processing ends.

TABLE 2

| time | source client ID | destination client ID | sub-user ID | ... |
|---|---|---|---|---|
| 13:05:55, Jan. 16, 2007 | abc | XianFengShuDian | ShopAssistant1 | ... |
| 11:45:10, Jan. 16, 2007 | abc | XianFengShuDian | ShopAssistant1 | ... |
| 14:23:49, Jan. 15, 2007 | abc | XianFengShuDian | ShopAssistant3 | ... |
| ... | ... | ... | ... | ... |

It is to be understood that after the context associated with the source client and the destination client is acquired, policies of the present invention can include a variety of other possible policies besides selecting an available sub-user with which the communication is the latest according to steps 307 and 308 shown in FIG. 3.

In another embodiment of the present invention, after the context associated with the source client and the destination client is acquired, a sub-user with the smallest load can be selected according to sub-users' load information in the context, and when the sub-user is determined as available, it is taken as the sub-user with which the source client communicates.

In a further embodiment of the present invention, after the context associated with the source client and the destination client is acquired, a sub-user in the nearest geographical location can be selected according to sub-users' geographical location information in the context, and when the sub-user is determined as available, it is taken as the sub-user with which the source client communicates.

Additionally, a proper sub-user can be selected to communicate with the source client according to age, gender or level in users' personal information of the source client. Other possible schemes include selecting a sub-user according to the period and bandwidth of communication or a combination of a variety of information. Those of ordinary skilled in the art can devise different schemes to select a sub-user according to the teaching of the present invention, and dynamically adjust the policy to select a sub-user.

Figure 4:
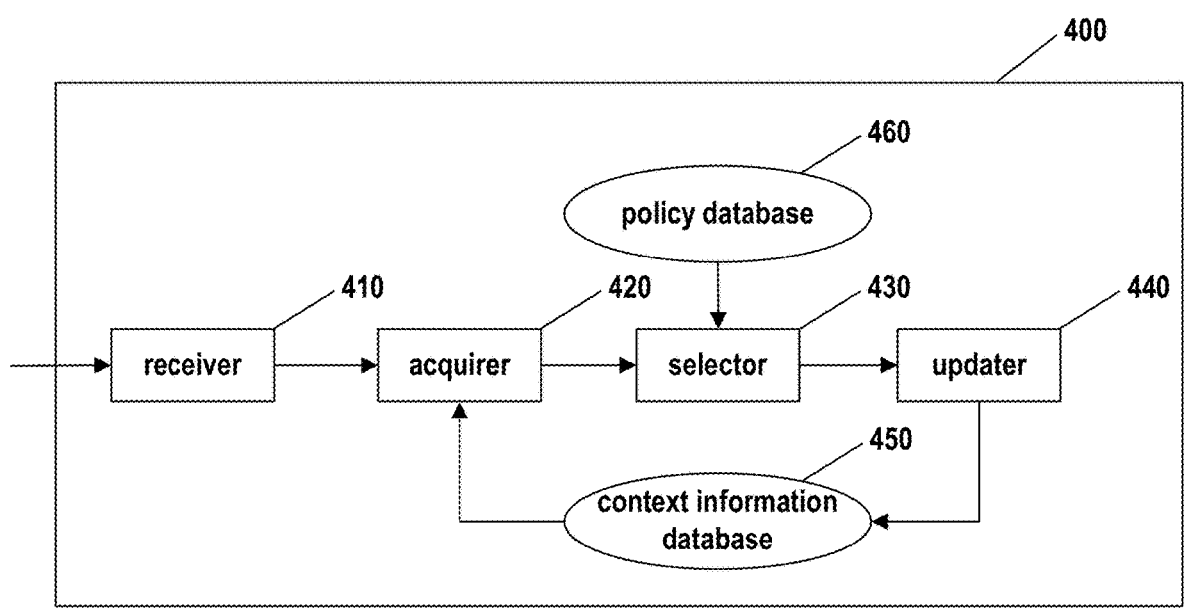
FIG. 4 is a block diagram of an apparatus for instant message routing according to an embodiment of the present invention.

FIG. 4 is a block diagram of an instant message routing apparatus 400 according to an embodiment of the present invention. Apparatus 400 comprises: a receiver 410, an acquirer 420 and a selector 430. Apparatus 400 may further comprise an updater 440. Moreover, apparatus 400 may comprise a context information database 450 and a policy database 460.

Receiver 410 is operable to receive a communication request from a source client to a destination client.

Acquirer 420 is operable to acquire the context associated with the source client and the destination client. Acquirer 420 may comprise means for determining whether or not the destination client is a virtual user and acquiring the context associated with the source client when the destination client is a virtual user.

Selector 430 is operable to select a sub-user of the destination client for communication using a policy according to said context. Selector 430 may comprise: means for acquiring the latest communication historical record in the context, to obtain IDs of the valid sub-users in the record and to select an available sub-user among the valid sub-users; means for acquiring sub-users' geographical location information in the context and selecting an available sub-user in the nearest geographical location; or means for acquiring sub-users' load information in the context and selecting an available sub-user with the smallest load.

Updater 440 is operable to update the context in the context information database according to a sub-user selection result from the selector.

Context information database 450 is operable to store the context.

Policy database 460 is operable to store policies for selecting a sub-user.

The present invention further discloses an instant message routing system comprising: a source client operable to communicate with a destination client; a destination client comprising one or more sub-users and operable to have one sub-user thereof communicate with the source client; a server operable to select a sub-user of the destination client for communication with the source client using a policy according to the context associated with the source client and the destination client. The server may comprise: a receiver 410, an acquirer 420 and a selector 430. The server may further comprise an updater. Moreover, the server may comprise a context information database 450 and a policy database 460.

It is to be understood that the method, apparatus and system for instant message routing of the present invention can also be applied to P2P instant messaging. During P2P instant messaging, the procedure for setting up underlying communication links between two clients might be different from that in a traditional instant messaging system, for example, the link information needs to be propagated over a P2P network. However, the method and apparatus for instant message routing of the present invention operate on the application layer of the instant messaging system to select a sub-user. Therefore, the method, apparatus and system of the present invention are also applicable to a P2P instant messaging system.

The method of the present invention is adapted to communication with a virtual user including a plurality of sub-users. Specifically, the method of the present invention can select for a source client a sub-user of the virtual user to communicate therewith using a policy according to the context containing information on the sub-user of the virtual user which once communicated with the source client. Therefore, after communication with a sub-user of the virtual user, the source client can communicate with the desired sub-user once more without the need to set up communication with a different sub-user of the virtual user each time.

The present invention further relates to a computer program product including codes for: receiving a communication request from a source client to a destination client; acquiring the context associated with the source client and the destination client; and selecting a sub-user of the destination client for communication using a policy according to the context.

Such a computer program product can be stored on a storage carrier.

While the foregoing has been with reference to specific embodiments of the invention, it will be appreciated by those skilled in the art that these are illustrations only and that changes in these embodiments can be made without departing from the principles of the invention, the scope of which is defined by the appended claims.

The invention claimed is:

1. A computer-implemented method within a server, comprising:

receiving, from a source client and prior to a communication session being set up between the source client and a destination client, a request to initiate an instant messaging (IM) communication with the destination client, querying, based upon the request, a client type table to identify a type of the destination client stored therein;

determining, based upon the type of the destination client, that the destination client is a virtual user including a group of sub-users;

acquiring, based upon a request, a context associated with the source client and the destination client;

identifying
a policy associated with the virtual user; and selecting, based upon the identified policy and the context, one of the sub-users; and transferring the request to the selected one of the sub-users, wherein the communication session between the source client and the destination client is set up after the request is transferred to the selected one of the sub-users.

2. The method of claim 1, wherein
the context includes information regarding a previous communication between the source client and the destination client.

3. The method of claim 2, wherein
based upon a determination that the information regarding the previous communication is not valid, a different policy is used for the selecting.

4. The method of claim 1, wherein
the context is updated based upon a result of the selecting.

5. The method of claim 1, wherein
the server establishes a communication between the source client and the selected one of the sub-users.

6. The method of claim 1, wherein
based upon the context, a combination of different policies are used for the selecting.

7. A server, comprising:

a memory storing instructions;

a hardware processor configured to execute the instructions to perform the following operations:

receiving, from a source client and prior to a communication session being set up between the source client and a destination client, a request to initiate an instant messaging (IM) communication with the destination client, querying, based upon the request, a client type table to identify a type of the destination client stored therein;

determining, based upon the type of the destination client, that the destination client is a virtual user including a group of sub-users;

acquiring, based upon a request, a context associated with the source client and the destination client;

identifying
a policy associated with the virtual user; and selecting, based upon the identified policy and the context, one of the sub-users; and transferring the request to the selected one of the sub-users, wherein the communication session between the source client and the destination client is set up after the request is transferred to the selected one of the sub-users.

8. The server of claim 7, wherein
the context includes information regarding a previous communication between the source client and the destination client.

9. The server of claim 8, wherein
based upon a determination that the information regarding the previous communication is not valid, a different policy is used for the selecting.

10. The server of claim 7, wherein
the context is updated based upon a result of the selecting.

11. The server of claim 7, wherein
the server establishes a communication between the source client and the selected one of the sub-users.

12. The server of claim 7, wherein
based upon the context, a combination of different policies are used for the selecting.

13. A computer program product, comprising:
a computer hardware storage device having stored therein program code,
the program code, which when executed by a server, cause the server to perform:
  receiving, from a source client and prior to a communication session being set up between the source client and a destination client, a request to initiate an instant messaging (IM) communication with the destination client,
  querying, based upon the request, a client type table to identify a type of the destination client stored therein;
  determining, based upon the type of the destination client, that the destination client is a virtual user including a group of sub-users;
  acquiring, based upon a request, a context associated with the source client and the destination client;
  identifying
  a policy associated with the virtual user; and
  selecting, based upon the identified policy and the context, one of the sub-users; and
  transferring the request to the selected one of the sub-users, wherein
the communication session between the source client and the destination client is set up after the request is transferred to the selected one of the sub-users.

14. The computer program product of claim 13, wherein
the context includes information regarding a previous communication between the source client and the destination client.

15. The computer program product of claim 14, wherein
based upon a determination that the information regarding the previous communication is not valid, a different policy is used for the selecting.

16. The computer program product of claim 13, wherein
the context is updated based upon a result of the selecting.

17. The computer program product of claim 13, wherein
the server establishes a communication between the source client and the selected one of the sub-users.

18. The computer program product of claim 13, wherein
based upon the context, a combination of different policies are used for the selecting.

* * * * *